July 7, 1936. W. F. ROCKWELL 2,047,118
REGISTER BOX WINDOW WIPER
Filed Aug. 27, 1931
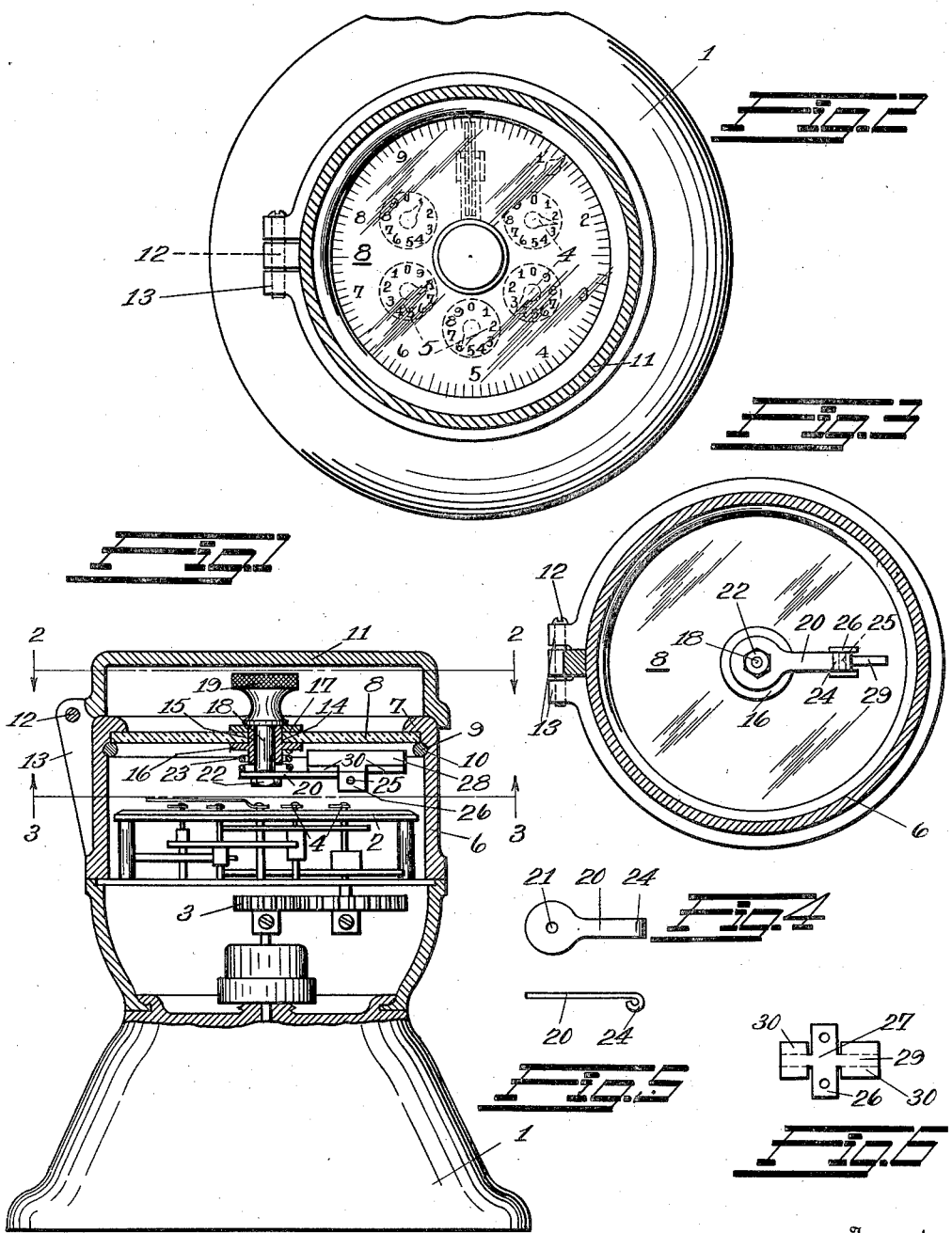
Inventor
Willard F. Rockwell
By Strauch & Hoffman
Attorneys Patented July 7, 1936

2,047,118

UNITED STATES PATENT OFFICE 2,047,118

REGISTER BOX WINDOW WIPER

Willard F. Rockwell, Pittsburgh, Pa., assignor to Pittsburgh Equitable Meter Company, Pittsburgh, Pa., a corporation of Pennsylvania Application August 27, 1931, Serial No. 559,805

1 Claim. (Cl. 15—250)

The present invention relates to cleaning devices for register box windows.

More particularly my invention relates to cleaning devices for the windows of water and like meters to permit rapid and accurate reading of meter indexes and the like.

Water meters are in practice usually installed in locations where reading of the meter dials even under most favorable conditions is difficult. In the best of the meter constructions in common use, it has been found that although the shaft of the dial actuating mechanism is packed, moisture frequently collects on the under side of the glass or window until it builds up into droplets which makes it difficult and sometimes impossible to obtain a correct reading of the dial. In the lower grade meters which are inefficiently packed, water enters the dial chamber and leaves a deposit of mud on the under side of the glass. Meters of this type are usually mounted in a pit in the ground, and the meter reader carries a tool for opening the closure thereof. This tool is frequently used to strike the sides of the meter box in efforts to dislodge the droplets from the glass. Frequently meters are damaged by this practice to such an extent as to cause them to cease registering, thereby rendering the meter of no value as a measuring device. Another expedient frequently employed in practice in removing objects from the glass is to break the glass, allowing extraneous matter to enter and to rapidly destroy the effectiveness of the metering mechanism.

While various devices have been heretofore proposed to clean the dials of meters, none of such prior proposed constructions has gone into practical use because of their failure to effectively solve the problem of providing clear vision through the register box to the indicating dial. Certain of such prior devices have been defective in that they did not clean the under side of the window and their operation has aggravated rather than minimized the difficulties of reading the register dials. Others of such prior proposed devices, due to their construction, are defective in only partially removing the dirt and moisture from the inner window surface. The prior proposed devices have furthermore been subject to the disadvantage of being expensive to manufacture and difficult to apply, rapidly get out of order, and can not readily be replaced when the window of the meter register box is broken as frequently occurs in practice.

Objects of this invention, accordingly, are to provide a cleaning device readily applied to the window of a water meter register, which is simple, easy to operate, will not readily get out of order, will effectively and rapidly remove any mist, droplets or mud that may have accumulated on the under side of the window, which is readily removable in case of breakage of glass and which is easy to manufacture.

It has been found that if the wiper in a cleaning device of this character is allowed to contact the glass when not in use, the wiping elements will leave a mark that will obscure the vision and is difficult to remove. Accordingly, it is a further object of this invention to provide a device embodying means for maintaining the wiping element of a register box window wiper out of contact with the glass except when in use for cleaning purposes.

Another object of this invention is to provide a register box window cleaning device in which the wiper is rotatably supported in the center of the glass, whereby the entire glass covering the dials to be read may be cleaned by a single rotation thereof.

A still further object of this invention is to provide a cleaning device that may be applied to the window of a meter dial or register box in such a manner, that in the event of a broken window, the device can easily be removed therefrom and inserted in a new window, and the whole replaced in the meter in a short time.

Other objects will become apparent from the following specification and appended claim, and from the accompanying drawing in which one preferred embodiment of my invention is illustrated.

As shown in the drawing:

Figure 1 is an elevation partly in section of a meter with my device applied thereto.

Figure 2 is a section on the line 2—2 of Figure 1, looking in the direction of the arrows.

Figure 3 is a section on the line 3—3 of Figure 1 as seen when looking in the direction of the arrows.

Figure 4 is a top view of the wiper arm.

Figure 5 is a side view of the wiper arm, and

Figure 6 is a view of the blank from which the wiper clamp is formed.

As the meter shown is of conventional type, details of its parts not related directly to the present invention have been shown only generally, and the description thereof has been omitted since my cleaning device may be applied to any type of meter or register box having a dial and a transparent window covering the dial.

Casting 1 houses the reducing gear train of a well known high grade type of water meter. On a frame the register mechanism or meter clock is mounted, designated broadly by the reference character 2. Suitable reduction gearing 3 connects the register clock to the meter reducing gear train all in well known manner. Shafts carrying index pointers 4 extend through the top of the register or meter clock, said top being provided with suitable dials 5 to cooperate with the pointers or hands in recording the flow handled by the meter in well known manner. A register box or casing 6 is provided which houses the meter clock or registering mechanism 2, the upper end of this casing terminating in an inwardly extending flange 7 to form a shoulder against which the window is adapted to rest.

Above the dial mechanism a glass window 8 is provided to exclude dust and other extraneous matter from the dial and meter mechanism. This window is removably secured in the casing 6 by means of the spring wire ring 9 which fits around the margin of the same and is sprung into the circumferential groove 10 in the inner wall of the casing 6, to force the window up against the flange 7. Surmounting the glass window is a conventional form of cover 11 which is pivoted on pin 12, the pin in turn being secured in the ears 13, integral with the casing 6.

The window 8 is apertured at 14 and the bushing 15, having flange 16 thereon, is inserted upwardly through the aperture and the washer 17 frictionally fitted thereon to retain the same in position.

This bushing and washer assembly forms a journal for the wiper carrying shaft 18 having the knurled knob 19 thereon. The lower end of this shaft is reduced in section and threaded, thus forming a shoulder against which the wiper arm 20, having aperture 21, is drawn by means of the nut 22. A compression spring 23 encircles the shaft and bushing and forces the shaft 18 and arm 20 downwardly which causes the lower face of the knob 19 to bear upon the washer 17.

As is clearly seen in Figure 5, the end of the arm 20 is downturned at 24 to form a bearing for the pin 25 which is journaled therein. This pin 25 forms a pivotal mounting for the wiper assembly and is secured at each end in a tab 26 of the clamp 27 of said assembly.

The wiper assembly comprises a wiping element 28 of felt or any other suitable material, and a clamp 27 for supporting the same. The blank from which the clamp is formed is shown in Figure 6, and comprises the tab portions 26 and a transverse portion 29, which has tabs 30 extending laterally therefrom at each end. The junction of the transverse portion with the tabs 30 has been shown in dotted lines in the drawing. In forming the clip the tabs 26 are bent downwardly and the tabs 30 bent upwardly along the dotted lines to firmly clamp about the lower edge of the wiping element 28.

It will be seen from the structure disclosed that the wiping element 28 is normally held out of engagement with the glass by spring 23 and contacts with the glass only during wiping operation, thereby avoiding formation of dirt lines on the glass due to permanent contact of the wiping element with the glass. To read the meter, the cover 11 is raised and the knob 19 grasped and raised against the action of spring 23 to bring the wiping element into firm contact with the window and given a single turn in either direction to completely clear the window of any matter which might obscure a clear view of the dial. The arrangement it will be noted permits the wiping element to be pressed firmly against the glass during the wiping operation with ample pressure by raising knob 19 firmly to effectively remove dirt, mist and the like which accumulates between monthly or less frequent inspection operations, and which cannot be effectively removed by any of the prior devices proposed for this purpose. In addition it will be noted that the mechanism may be readily removed and replaced in the glass by removing arm 20 from shaft 18, withdrawing the shaft 18 from the bushing assembly, removing washer 17, and withdrawing bushing 15 from the glass. The disassembled mechanism may then be reassembled in a new glass without special tools providing for convenient replacement of broken glasses in the field.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:—

A window wiper comprising a bushing adapted to extend through an aperture in a window and having an integral flange thereon intermediate its ends adapted to abut one face of the window, a locking member frictionally fitted on one end of said bushing and adapted to abut the other face of the window, a rotatable shaft slidably extending through said bushing and having an arm mounted on the end of the shaft at the other end of said bushing and carrying a cleaning member mounted on one end thereof, a spring surrounding said bushing and abutting said flange and arm for maintaining said cleaning member out of contact with the window when not in use, and an operating knob secured to the other end of said shaft limiting movement thereof.

WILLARD F. ROCKWELL.